US010075225B2

United States Patent
Hessler et al.

(10) Patent No.: US 10,075,225 B2
(45) Date of Patent: Sep. 11, 2018

(54) METHOD AND APPARATUS FOR SELECTING ANTENNA BEAMFORMING PRECODING VECTORS FOR TRANSMISSIONS

(71) Applicant: Telefonaktiebolaget LM Ericsson (publ), Stockholm (SE)

(72) Inventors: Martin Hessler, Linköping (SE); Eleftherios Karipidis, Stockholm (SE); Sven Petersson, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 180 days.

(21) Appl. No.: 15/036,107

(22) PCT Filed: Mar. 24, 2016

(86) PCT No.: PCT/EP2016/056661
§ 371 (c)(1),
(2) Date: May 12, 2016

(87) PCT Pub. No.: WO2017/162303
PCT Pub. Date: Sep. 28, 2017

(65) Prior Publication Data
US 2018/0091210 A1    Mar. 29, 2018

(51) Int. Cl.
*H04B 7/06*    (2006.01)
(52) U.S. Cl.
CPC ......... *H04B 7/0691* (2013.01); *H04B 7/0689* (2013.01)
(58) Field of Classification Search
CPC ... H04B 7/0456; H04B 7/0408; H04B 7/0482
USPC .................................. 375/299, 267
See application file for complete search history.

(56) References Cited

U.S. PATENT DOCUMENTS

2013/0250789 A1*    9/2013 McWilliams ........ H04B 7/0456
                                                                   370/252

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.0.0, Jun. 2012, 1-302.

\* cited by examiner

*Primary Examiner* — Kevin Kim
(74) *Attorney, Agent, or Firm* — Murphy, Bilak & Homiller, PLLC (57) ABSTRACT

A method, in a transmitting device having a plurality of transmitter antennas, for selecting antenna beam-forming precoding vectors for transmissions is provided. The method comprises transmitting to a receiving device at a first time, using a first beam-forming precoding vector that maps symbols to be transmitted to the plurality of transmitter antennas. The method further comprises determining, prior to transmitting to the receiving device at a second time, whether an elapsed time since the first time exceeds a first threshold. The method further comprises selecting one of at least two beam-forming precoding vectors for use in transmitting to the receiving device at the second time, based on said determining. Then, transmitting to the receiving device at the second time, using the selected one of the at least two beam-forming precoding vectors. There is also provided a transmitting device.

22 Claims, 4 Drawing Sheets

METHOD AND APPARATUS FOR SELECTING ANTENNA BEAMFORMING PRECODING VECTORS FOR TRANSMISSIONS

TECHNICAL FIELD

The present invention relates to a method, in a transmitting device having a plurality of transmitter antennas, for selecting antenna beam-forming precoding vectors for transmissions. The present invention further relates to a transmitter device having a plurality of transmitter antennas.

BACKGROUND

In wireless communications networks one of the most important and fundamental problems is to set the output power of the transmitting devices. In many systems, for example in Long Term Evolution, LTE, the radio links have a Downlink, DL, and an Uplink, UL. The Downlink is a transmission from a "master" node such as a base station (eNB) to a "slave" node such as a User Equipment, UE. The Uplink is a transmission from the "slave" node to the "master node". A downlink transmission may schedule an Uplink transmission on the radio link from the "slave" node.

Often the DL transmit power is a fixed power density according to a maximum power. And the UL transmit power is determined by the slave node, based on measurements of a downlink reference signal received from the master node. The aim is that all UL transmissions are received at the master node at more or less the same power.

In LTE, power control is applied per Uplink, UL, physical channel. For example, for the Physical Uplink Shared Data Channel PUSCH, the transmitted power by the UE in subframe i is determined by the formula:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}$$

where $P_{CMAX}(i)$ is the configured maximum UE transmit power, $M_{PUSCH}(i)$ is the number of resource block allocated for the UE, $P_{O\_PUSCH}(j)$ is a parameter consisting of the sum of a cell-specific and a UE-specific part provided by higher layers, $\alpha$ is a cell-specific parameter configured by higher layers (also known as fractional pathloss compensation factor), PL is the downlink pathloss estimate calculated by the UE, $\Delta_{TF}(i)$ is a UE-specific parameter provided by higher layers and f(i) is UE-specific correction term controlled by Transmit Power Control, TPC, commands sent in uplink grants on the Physical Downlink Control Channel, PDCCH. In later releases of the 3GPP specifications power control is slightly more complicated due to the support of multi-carrier where a UE can support multiple serving cells.

Antenna beamforming is a signal processing technique whereby, in a transmitting device comprising a plurality of transmit antennas, a signal to be transmitted is mapped to the plurality of transmit antennas so as to increase the power of the signal received at the receiving device. A transmitting device, for example a UE, may calculate a beamforming precoding vector for a transmission, based on measurements of reference signals received from the receiving device, for example using SVD (Single Value Decomposition).

At lower frequencies beamforming may not be necessary. However, at higher frequencies, such as those likely to be used in future wireless systems, beamforming is expected to be required.

The Applicant has appreciated that it may therefore be desirable to use antenna beamforming in UEs, including those which have long discontinuous transmission, DTX, and/or discontinuous reception, DTX inactive times. These times are effectively periods, in which the UE is in "sleep mode", and so does not transmit and or receive transmissions. This enables low power consumption, which is advantageous for many for example machine type applications. However, these inactive periods make uplink beamforming difficult, since the decorrelation time of a beamforming precoding vector may be shorter than the DTX and/or DRX period, during which no reference signals are available for beamforming calculations. In current systems such as LTE, the DTX/DRX reference signal non-availability duration is a maximum of 5 ms. It is expected that in 5G, the DTX/DRX reference signal non-availability duration will be up to 100 ms.

SUMMARY

According to the present invention, there is provided a method, in a transmitting device having a plurality of transmitter antennas, for selecting antenna beam-forming precoding vectors for transmissions. The method comprises transmitting to a receiving device at a first time, using a first beam-forming precoding vector that maps symbols to be transmitted to the plurality of transmitter antennas. The method further comprises determining, prior to transmitting to the receiving device at a second time, whether an elapsed time since the first time exceeds a first threshold. The method further comprises selecting one of at least two beam-forming precoding vectors for use in transmitting to the receiving device at the second time, based on said determining. The method further comprises transmitting to the receiving device at the second time, using the selected one of the at least two beam-forming precoding vectors.

Advantageously, the present invention enables the selection of a beam-forming precoding vector for a second transmission, from a plurality of beam-forming precoding vectors, based on whether an elapsed time since a first transmission using a first beamforming precoding vector exceeds a threshold. Thus, for example, the transmitting device may select an "optimum" beam-forming precoding vector, with a short decorrelation time, if the elapsed time is less than the first threshold, and a less "optimum" beam-forming vector, with a longer decorrelation time, if the elapsed time is greater than the threshold. Thus, beamforming gain may advantageously be improved, even when reference signals for calculation of new beam-forming vectors are not available from the receiving device. Thus, the transmitting device may be more power efficient.

There is also provided a computer program product comprising program instructions for a processor in a transmitter device having a plurality of transmitter antennas, wherein said program instructions are configured so as to cause the transmitter device, when the program instructions are executed by the processor, to perform the above method.

There is further provided a non-transitory computer-readable medium comprising, stored thereupon, the computer program product.

There is further provided a transmitter device comprising a plurality of transmitter antennas. The transmitter device further comprises processing circuitry configured via the plurality of transmitter antennas to: transmit to a receiving device at a first time, using a first beam-forming precoding vector that maps symbols to be transmitted to the plurality of transmitter antennas; determine, prior to transmitting to the receiving device at a second time, whether an elapsed time since the first time exceeds a first threshold; select one of at least two beam-forming precoding vectors for use in transmitting to the receiving device at the second time, based on said determining; and transmit to the receiving device at the second time, using the selected one of the at least two beam-forming precoding vectors.

There is further provided a User Equipment, UE, comprising the transmitter device.

There is also provided a transmitter device comprising a plurality of transmitter antennas and the following modules: a first transmitting module for transmitting to a receiving device at a first time, using a first beam-forming precoding vector that maps symbols to be transmitted to the plurality of transmitter antennas; a determining module for determining, prior to transmitting to the receiving device at a second time, whether an elapsed time since the first time exceeds a first threshold; a selecting module for selecting one of at least two beam-forming precoding vectors for use in transmitting to the receiving device at the second time, based on said determining; and a second transmitting module for transmitting to the receiving device at the second time, using the selected one of the at least two beam-forming precoding vectors.

DESCRIPTION OF THE DRAWINGS

Embodiments of the present invention will now be described, by way of example only, with reference to the accompanying drawings in which.

DETAILED DESCRIPTION

Figure 1:
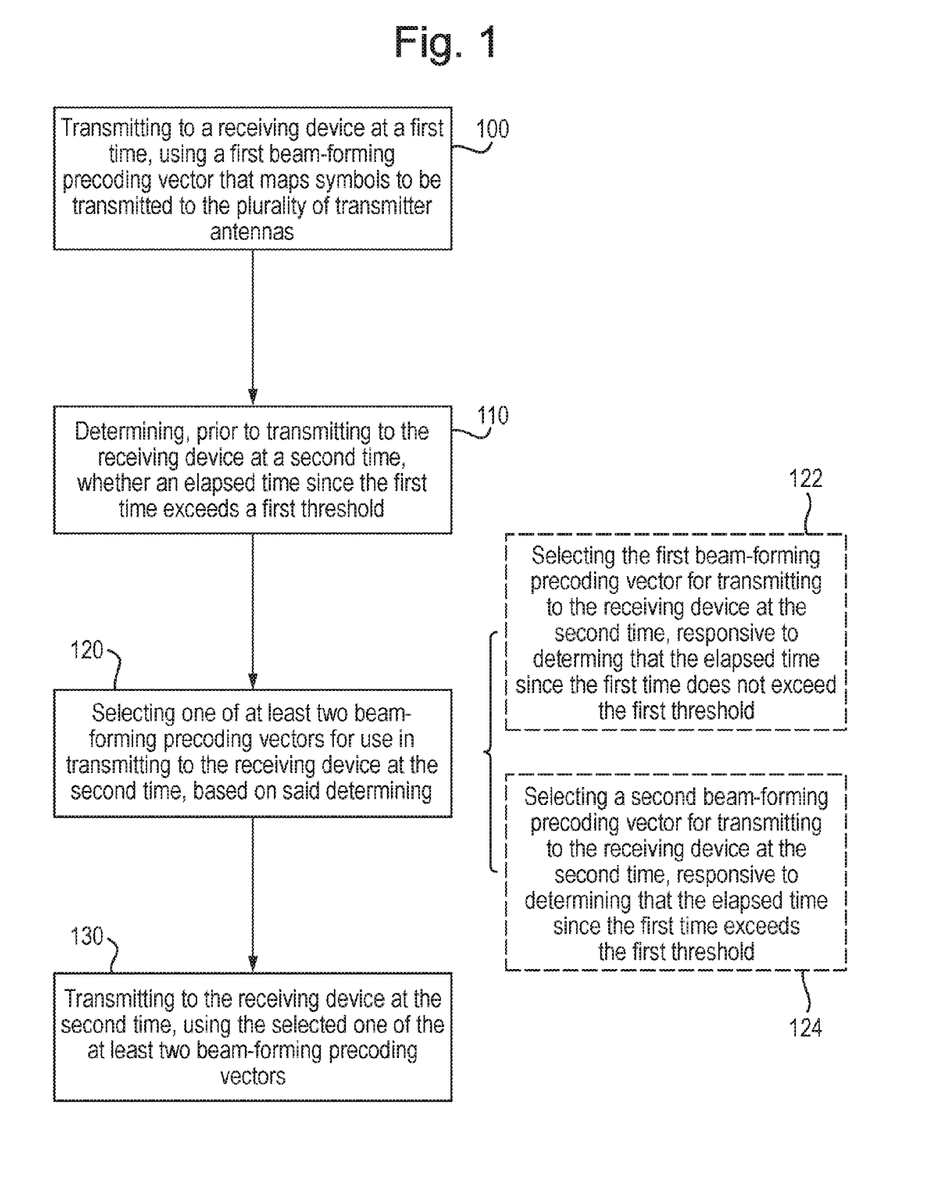
FIG. 1 shows a method according to an embodiment of the present invention.

FIG. 1 shows a method, in a transmitting device having a plurality of transmitter antennas, for selecting antenna beam-forming precoding vectors for transmissions according to an embodiment of the present invention.

In this example, the transmitting device is a User Equipment, UE, and the transmissions are uplink transmissions, to a receiving device for example in the form of a radio network node. Alternatively, however, the transmitting device may be any other type of transmitting device. For example the transmitting device may be a radio network node, and the transmissions may be downlink transmissions, to a receiving device for example in the form of a UE.

The term UE or mobile terminal is intended to refer to any type of wireless device that communicates with a radio network node in a cellular or mobile communication system. Examples of UE are target device, device to device (D2D) UE, machine type UE or UE capable of machine-to-machine (M2M) communication, PDA, Tablet, mobile terminals, smart phone, laptop-embedded equipped (LEE), laptop-mounted equipment (LME), USB dongles, etc. It should be understood that the term mobile terminal is meant to refer to any and all of these access terminal types, some of which may be fixed in a given location. Thus, a mobile terminal is not necessarily "mobile."

The term radio network node or simply network node is intended to refer to any type of network node that serves UE and/or connected to other network node or network element or any radio node from where UE receives signal. Examples of various types of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

Referring to FIG. 1, the method comprises at step 100 transmitting to a receiving device at a first time, using a first beam-forming precoding vector that maps symbols to be transmitted to the plurality of transmitter antennas. As will be understood by those skilled in the art, these symbols may be referred to as modulation symbols. The method further comprises at step 110 determining, prior to transmitting to the receiving device at a second time, whether an elapsed time since the first time exceeds a first threshold. The method further comprises selecting at step 120 one of at least two beam-forming precoding vectors for use in transmitting to the receiving device at the second time, based on said determining, and at step 130 transmitting to the receiving device at the second time, using the selected one of the at least two beam-forming precoding vectors. It should be appreciated that at least some of the steps may be performed in parallel.

In this example, the method comprises at step 122 selecting the first beam-forming precoding vector for transmitting to the receiving device at the second time, responsive to determining that the elapsed time since the first time does not exceed the first threshold.

The method further comprises at step 124 selecting a second beam-forming precoding vector (different from the first beam-forming precoding vector) for transmitting to the receiving device at the second time, responsive to determining that the elapsed time since the first time exceeds the first threshold.

The second beam-forming precoding vector may have an associated decorrelation time that is greater than a decorrelation time associated with the first beam-forming precoding vector. For example, the first beam-forming precoding vector may be calculated using Single Value Decomposition, SVD, and picking the strongest singular value. This method may result in an "optimal" beam-forming precoding vector. The second beam-forming precoding vector may on the other hand be calculated using for example Antenna selection which picks the transmit antenna (antenna element) with the strongest signal. Thus, for example step 124 may comprise, responsive to determining that the elapsed time since the first time exceeds the predetermined threshold, selecting, from among the plurality of transmitter antennas, the transmitter antenna estimated to provide a strongest signal to the receiving device, wherein the second beam-forming precoding vector is an antenna selection precoding vector that maps symbols to be transmitted to the selected transmitter antenna. Antenna selection may offer a less optimal beam-forming precoding vector. However, it has a longer decorrelation time.

Generally, a narrower beam implies a shorter decorrelation time than a wider beam, and the maximum distance between used transmit antennas correlates inversely with decorrelation times. Thus, antenna selection, which uses only one antenna element, may offer a maximum decorrelation time. However, it should be noted that, although in antenna selection the maximum distance is 0, the decorrelation time may not be 1/0, i.e. infinite, as the antenna pattern may not become "omni", i.e. an isotropic antenna.

It should be appreciated however that SVD and antenna selection are only two possible beamforming methods, and other beam-forming precoding methods may be used to calculate the first and second beam-forming precoding vectors respectively, as will be understood by those skilled in the art.

Figure 3:
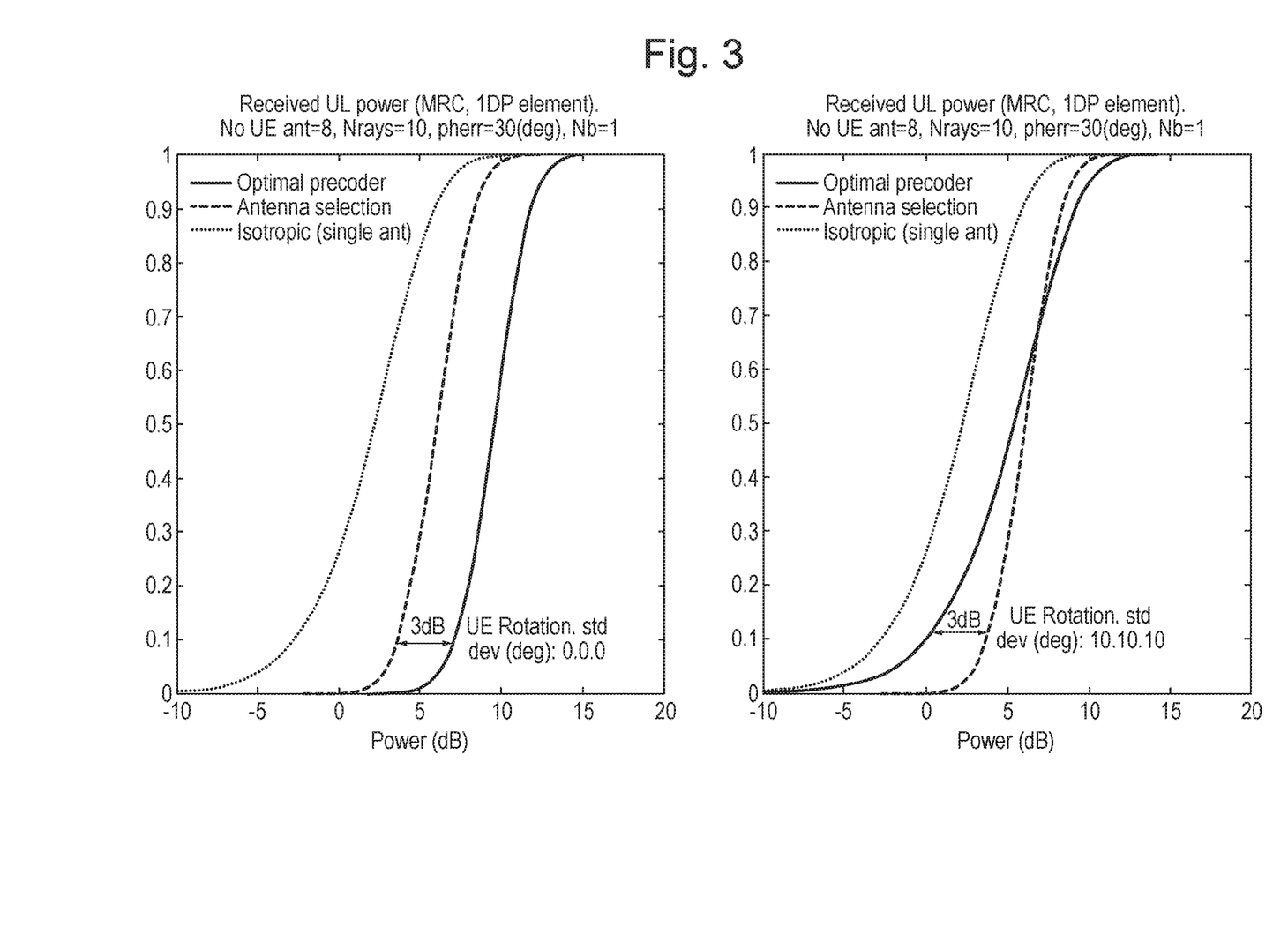
FIG. 3 is a graph illustrating power savings according to a preferred embodiment of the present invention.

FIG. 3 shows, by way of example only, two graphs showing UL receive power on the x axis, of transmissions from a UE, and beam-forming gain including fast-fading on the y axis. The graphs show results for an "optimal" precoder using SVD (solid line), an antenna selection precoder (dashed line), and an isotropic transmitter with a single antenna (dotted line) for comparison. In this example, we assume that the network transmits a system signature transmission (SSI) that contains a downlink pilot that can be used for beam-forming calculation each 100 ms and that the UE is rotated roughly 100 degrees/sec. The graph on the lefthand side shows the situation immediately after SSI transmission, whereas the graph on the righthand side shows the case where there has subsequently been a standard deviation of UE rotation of 10 degrees. It is seen that, in the graph on the lefthand side, the optimal precoder results in approximately 3 dB increased receive power at $10^{th}$ percentile, in comparison to the antenna selection precoder. However, in the graph on the righthand side, at $10^{th}$ percentile, the antenna selection precoder results in greater received power, by 3 dB, than the optimal precoder. Note that the $10^{th}$ percentile has been selected as corresponding to a 10% BLER target, which is a quite common target in transmission link-adaption decisions. Thus, it is shown that at an intermediate point switching from the optimal precoder to the antenna selection pre-coder will save power. Further, it is shown that in the extreme cases, in this example, up to 50% power may be saved, in comparison to only picking one of the precoders for the duration, between receipt of pilot signals for beamforming calculations.

A method, in a transmitting device having a plurality of transmit antennas, according to a preferred embodiment of the present invention will now be described with reference to FIG. 2.

At 200, the method comprises receiving a pilot signal transmitted by a receiving device. This pilot signal may also be called a reference signal.

In this example, the method then comprises at 205 calculating a first beam-forming precoding vector for transmissions, based on measurements of the pilot signal. This first beam-forming precoding vector may be calculated using SVD. However, other calculation methods are possible.

At the same time, at 210 the method may further comprise calculating the second beam-forming precoding vector based on measurements of the pilot signal transmitted by the receiving device (using a different calculation method). This calculation method may for example, but not exclusively be antenna selection. It is practical to calculate the second beam-forming precoding vector at the same time as the first beam-forming precoding vector, and then store both the first beam-forming precoding vector and the second beam-forming precoding vector. However, it is possible that the measurement of the pilot signal may instead be saved, such that the second beam-forming precoding vector can be calculated later, for example after use of the second beam-forming precoding vector has been selected.

In addition, it should be appreciated that, rather than the transmitting device calculating the first beam-forming precoding vector and or the second beam-forming precoding vector based on measurements of reference signals, these beam-forming precoding vectors could for example be obtained by the transmitting device based on an indication of the respective vectors received by the transmitting device from the receiving device.

At step 220, the method comprises transmitting to the receiving device at a first time, using the first beam-forming precoding vector. As described above, the first beam-forming precoding vector maps (modulation) symbols to be transmitted to the plurality of transmit antennas.

Figure 2:
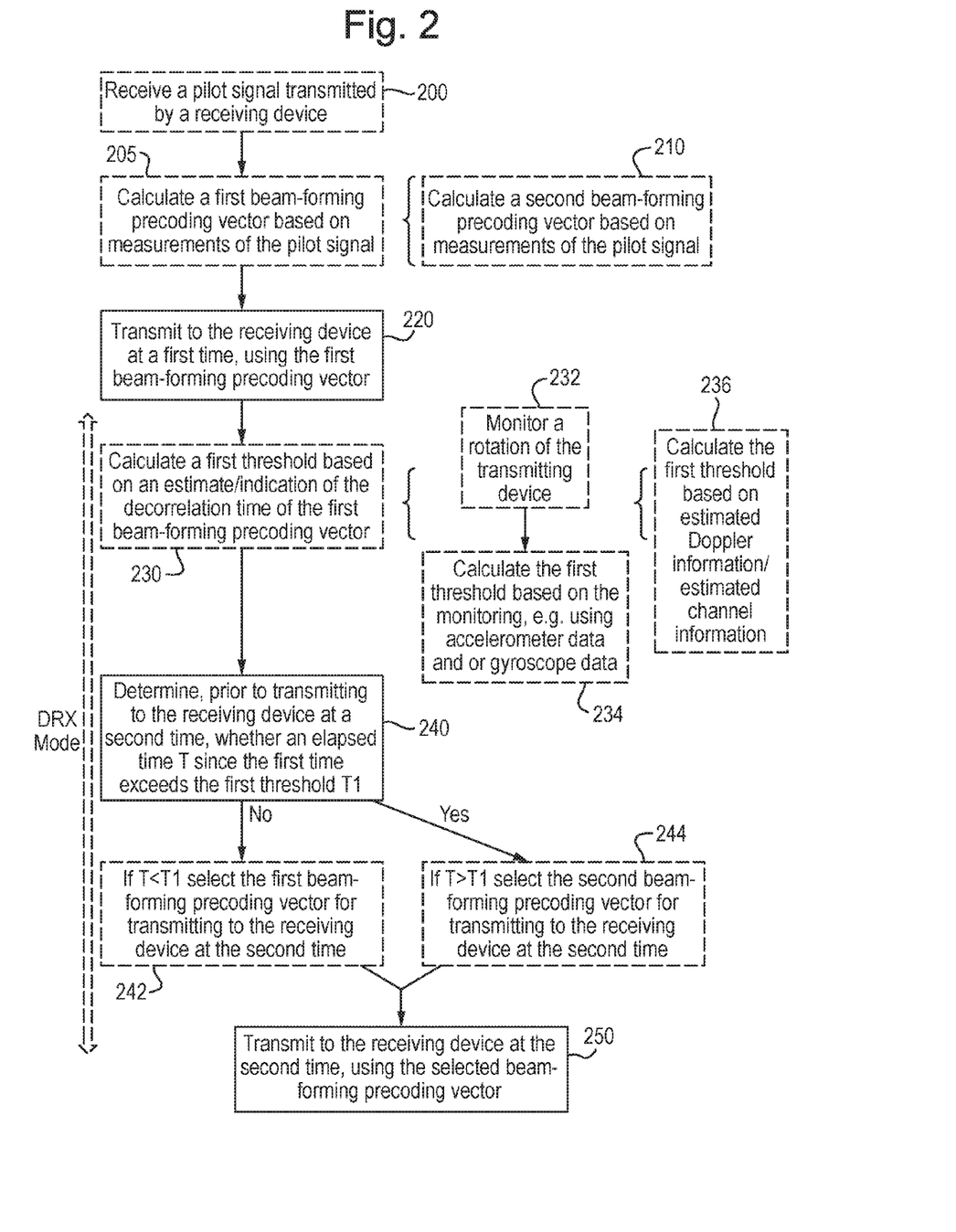
FIG. 2 shows methods according to preferred embodiments of the present invention.

In this example, as indicated by a dotted arrow a in FIG. 2, the transmitting device is a UE and the UE now enters discontinuous reception, DRX, and optionally discontinuous transmission, DTX mode. This means that the UE stops receiving signals from the receiving device.

Prior to transmitting to the receiving device at a second time (subsequent to the first time), at 240, the method comprises determining whether an elapsed time T since the first time exceeds a first threshold T1.

In this example, the method further comprises, at 230, calculating the first threshold, for example based on an estimate or indication of the decorrelation time of the first beam-forming precoding vector. This decorrelation time as discussed above depends on the antenna pattern used by the first beam-forming precoding vector. However, in addition, the decorrelation time is dependent on for example the amount of rotation of the transmitting device. For example, a greater rotation will correspond to a shorter decorrelation time, and lesser rotation will correspond to a longer decorrelation time. Preferably therefore the first threshold may be set dynamically, such that the first threshold can take into account for example the actual rotation of the transmitting device since the first time.

By way of example only, if say a rotation of 15 degrees is permitted (in view of the antenna pattern), and the current rotation of the transmitting device is 100 degrees/sec, the threshold may be set at 15/100=0.15 seconds.

Thus, in a preferred embodiment, step 230 may comprise monitoring 232 a rotation (for example speed and/or angle) of the transmitting device; and calculating 234 the first threshold based on said monitoring. This may comprise calculating the first threshold based on accelerometer data and/or gyroscope data of the transmitting device.

In addition, the method may further or alternatively comprise at 236 calculating the first threshold, based on estimated Doppler information and/or estimated channel information corresponding to the path between the transmitting device and the receiving device. These are factors which may also affect the decorrelation times of the beam-forming precoding vectors.

However, it should be appreciated that, in other examples, the first threshold may be preconfigured. For example, the transmitting device could receive an indication of the first threshold from the receiving device.

In this example, if the elapsed time T is less than the first threshold, T1, the first beam-forming precoding vector is selected for transmitting to the receiving device at the second time, as shown at 250. However, if the elapsed time T is greater than the first threshold, T2, the second beam-forming precoding vector is selected for transmitting to the receiving device at the second time, as shown at 260.

In this example, as shown by the dotted arrow in FIG. 2, the transmitting device exits DRX/DTX "sleep" mode, and at 260 transmits to the receiving device at the second time using the selected one of the plurality of beam-forming precoding vectors.

Thus, advantageously, beamforming gain may be optimised.

It should be appreciated that, although only two beam-forming precoding vectors are described in this example, some embodiments may comprise more than two beam-forming precoding vectors and multiple thresholds. For example, the method may further comprise determining, prior to transmitting to the receiving device at a second time, whether an elapsed time since the first time exceeds a second threshold, the second threshold being a greater time interval than the first threshold, and wherein the selecting of one of the at least two beam-forming precoding vectors for use in transmitting to the receiving device at the second time is further based on whether the elapsed time is between the first and second thresholds. For example, a different beam-forming precoding vector may be selected if the elapsed time is between the first and second thresholds, in comparison to if the elapsed time exceeds the second threshold.

In some embodiments a computer program product comprising program instructions for a processor in a transmitter device having a plurality of transmitter antennas may be provided. The program instructions are configured so as to cause the transmitter device, when the program instructions are executed by the processor, to perform the method of any of the embodiments described above.

A non-transitory computer-readable medium may also be provided comprising, stored thereupon, the computer program product. The non-transitory computer-readable medium may for example but not exclusively be disk storage or solid state memory storage.

A transmitter device having a plurality of transmit antennas may be configured to perform the methods described above.

Figure 4:
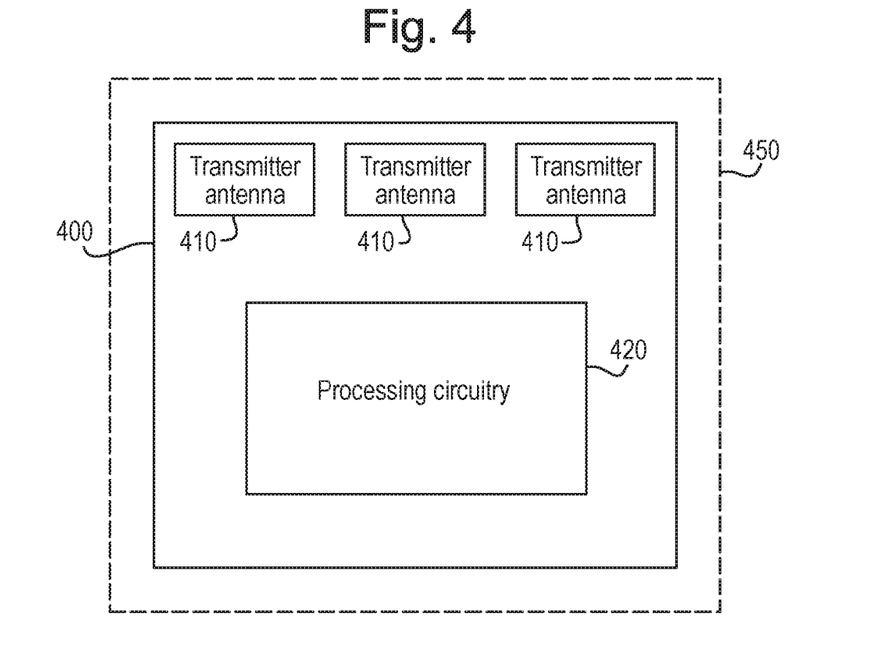
FIG. 4 shows apparatus according to an embodiment of the present invention.

FIG. 4 shows an example of a transmitter device 400 according to an embodiment of the present invention. The transmitter device 400 comprises a plurality of transmitter antennas 410, and processing circuitry 420.

The processing circuitry 420 may comprise one or more digital processors e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any combination thereof. More generally, the processing circuitry 420 may comprise fixed circuitry, or programmable circuitry that is specially configured via the execution of program instructions implementing the functionality taught herein, or may comprise some combination of fixed and programmable circuitry. The processor(s) may be multi-core.

The processing circuitry 420 may also include a memory. The memory, in some embodiments, stores one or more computer programs and, optionally, configuration data. The memory provides non-transitory storage for the computer program and it may comprise one or more types of computer-readable media, such as disk storage, solid-state memory storage, or any combination thereof. By way of non-limiting example, the memory may comprise any one or more of SRAM, DRAM, EEPROM, and FLASH memory, which may be in the processing circuitry and/or separate from the processing circuitry. In general, the memory comprises one or more types of computer-readable storage media providing non-transitory storage of the computer program and any configuration data used by the node.

Regardless of the implementation, the processing circuitry 420 is configured to perform operations, as described in the above embodiments. For example, the processing circuitry 420 is configured via the plurality of transmitter antennas 410 to: transmit to a receiving device at a first time, using a first beam-forming precoding vector that maps symbols to be transmitted to the plurality of transmitter antennas; determine, prior to transmitting to the receiving device at a second time, whether an elapsed time since the first time exceeds a first threshold; select one of at least two beam-forming precoding vectors for use in transmitting to the receiving device at the second time, based on said determining; and transmit to the receiving device at the second time, using the selected one of the at least two beam-forming precoding vectors.

The processing circuitry 420 may further be configured to select the first beam-forming precoding vector for transmitting to the receiving device at the second time, responsive to determining that the elapsed time since the first time does not exceed the first threshold.

The processing circuitry 420 may further be configured to select a second beam-forming precoding vector for transmitting to the receiving device at the second time, responsive to determining that the elapsed time since the first time exceeds the first threshold. For example, the processing circuitry 420 may be configured to, responsive to determining that the elapsed time since the first time exceeds the predetermined threshold, selecting, from among the plurality of transmitter antennas, the transmitter antenna estimated to provide a strongest signal to the receiving device, wherein the second beam-forming precoding vector is an antenna selection precoding vector that maps symbols to be transmitted to the selected transmitter antenna. The second beam-forming precoding vector may have an associated decorrelation time that is greater than a decorrelation time associated with the first beam-forming precoding vector.

Further, the processing circuitry 420 may be configured to calculate the first threshold, for example based on an indication of the decorrelation time of the first beam-forming precoding vector. In a preferred embodiment, the processing circuitry 420 may be configured to monitor a rotation of the transmitting device, and calculate the first threshold based on said monitoring. For example, the processing circuitry 420 may be configured to calculate the first threshold based on accelerometer data and/or gyroscope data of the transmitting device. In addition or alternatively the processing circuitry 420 may be configured to calculate the first threshold, based on estimated Doppler information and/or estimated channel information corresponding to the path between the transmitting device and the receiving device.

In some embodiments, the processing circuitry 420 may further be configured to determine, prior to transmitting to the receiving device at a second time, whether an elapsed time since the first time exceeds a second threshold, the second threshold being a greater time interval than the first threshold, wherein the processing circuitry 420 is configured to select one of the at least two beam-forming precoding vectors for use in transmitting to the receiving device at the second time further based on whether the elapsed time is between the first and second thresholds.

The processing circuitry 420 may be configured to calculate the first beam-forming precoding vector based on measurements of a pilot signal transmitted by the receiving device. The processing circuitry 420 may be configured to calculate the second beam-forming precoding vector based on measurements of the pilot signal transmitted by the receiving device.

In this example, the transmitter device 400 is comprised in a User Equipment 450. However, as mentioned above, other implementations can be envisaged. For example, the transmitter device 400 may be comprised in a radio network node, such as a base station.

The User Equipment 450 may be configured to operate using discontinuous reception DRX and or discontinuous transmission, DRT. During "the elapsed time", the User Equipment may be in discontinuous reception, DRX, mode. That is, the UE may not receive any reference signals from which to calculate beam-forming precoding vectors during this time. This means that the transmitting device may advantageously be more power efficient. Fewer channel estimates and precoder calculations may be required. Further, the overhead in the downlink can be lower, as the receiving device (e.g. network node) does not need to transmit frequency training signals to the transmitting device.

Figure 5:
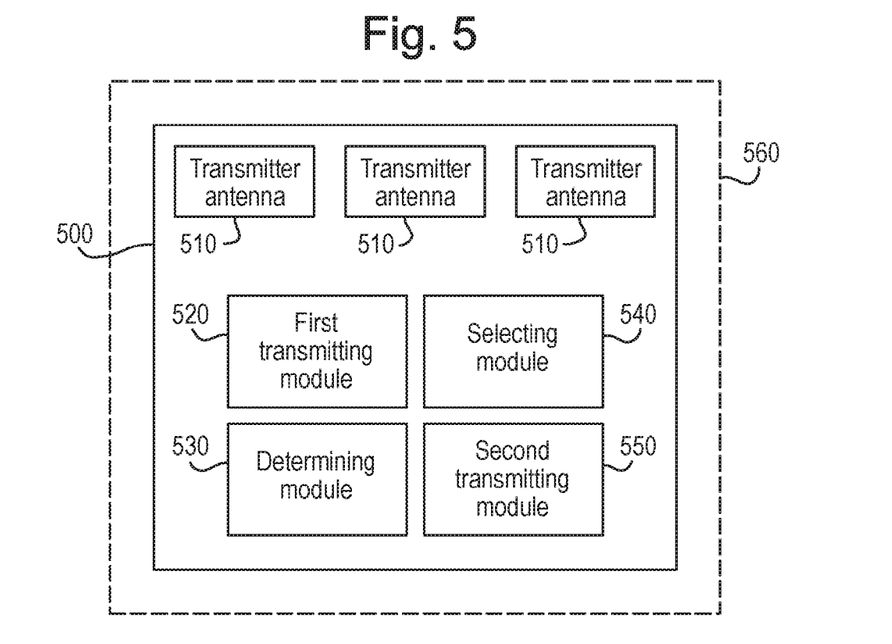
FIG. 5 shows apparatus according to an embodiment of the present invention.

FIG. 5 shows a further transmitter device 500 embodying the present invention. The transmitter device 500 comprises a plurality of transmitter antennas 510. In addition, the transmitter device 500 comprises a number of functional modules, which may for example be implemented using processing circuitry as defined above. The transmitter device 500 comprises a first transmitting module 520 for transmitting to a receiving device at a first time, using a first beam-forming precoding vector that maps symbols to be transmitted to the plurality of transmitter antennas; a determining module 530 for determining, prior to transmitting to the receiving device at a second time, whether an elapsed time since the first time exceeds a first threshold; a selecting module 540 for selecting one of at least two beam-forming precoding vectors for use in transmitting to the receiving device at the second time, based on said determining; and a second transmitting module 550 for transmitting to the receiving device at the second time, using the selected one of the at least two beam-forming precoding vectors.

Although the techniques and apparatus described herein are expected to be used in 5G systems, terminology used in the specification of LTE systems may be used herein, for convenience. It will be understood that other names may apply to the same or similar parameters, channels, etc. It should also be appreciated that the techniques and apparatus described herein may be designed for backwards compatibility with LTE and/or other systems, but are not necessarily so. Embodiments of the presently disclosed techniques and apparatus are applicable also to single-carrier as well as to multicarrier (MC) or carrier aggregation (CA) operation of the UE.

The invention claimed is:

1. A method, in a transmitting device having a plurality of transmitter antennas, for selecting antenna beam-forming precoding vectors for transmissions, the method comprising:
transmitting to a receiving device at a first time, using a first beam-forming precoding vector that maps symbols to be transmitted to the plurality of transmitter antennas;
determining, prior to transmitting to the receiving device at a second time, whether an elapsed time since the first time exceeds a first threshold;
selecting one of at least two beam-forming precoding vectors for use in transmitting to the receiving device at the second time, based on said determining; and
transmitting to the receiving device at the second time, using the selected one of the at least two beam-forming precoding vectors;
wherein the method further comprises calculating the first threshold according to at least one of the following:
calculating the first threshold based on an estimate of the decorrelation time of the first beam-forming precoding vector;
monitoring a rotation of the transmitting device and calculating the first threshold based on said monitoring;
calculating the first threshold based on accelerometer data and/or gyroscope data of the transmitting device; and
calculating the first threshold based on estimated Doppler information and/or estimated channel information corresponding to the path between the transmitting device and the receiving device.

2. The method of claim 1, wherein the method comprises selecting the first beam-forming precoding vector for transmitting to the receiving device at the second time, responsive to determining that the elapsed time since the first time does not exceed the first threshold.

3. The method of claim 1, wherein the method comprises selecting a second beam-forming precoding vector for transmitting to the receiving device at the second time, responsive to determining that the elapsed time since the first time exceeds the first threshold.

4. The method of claim 3, wherein the second beam-forming precoding vector has an associated decorrelation time that is greater than a decorrelation time associated with the first beam-forming precoding vector.

5. The method of claim 3, wherein the method further comprises, responsive to determining that the elapsed time since the first time exceeds the predetermined threshold, selecting, from among the plurality of transmitter antennas, the transmitter antenna estimated to provide a strongest signal to the receiving device, and wherein the second beam-forming precoding vector is an antenna selection precoding vector that maps symbols to be transmitted to the selected transmitter antenna.

6. The method of claim 1, wherein the method further comprises determining, prior to transmitting to the receiving device at a second time, whether an elapsed time since the first time exceeds a second threshold, the second threshold being a greater time interval than the first threshold, and wherein the selecting of one of the at least two beam-forming precoding vectors for use in transmitting to the receiving device at the second time is further based on whether the elapsed time is between the first and second thresholds.

7. The method of claim 1, wherein the method further comprises calculating the first threshold based on an estimate of the decorrelation time of the first beam-forming precoding vector.

8. The method of claim 1, wherein the method comprises monitoring a rotation of the transmitting device; and calculating the first threshold based on said monitoring.

9. The method of claim 8, wherein the method comprises calculating the first threshold based on accelerometer data and/or gyroscope data of the transmitting device.

10. The method of claim 1, wherein the method further comprises calculating the first threshold, based on estimated Doppler information and/or estimated channel information corresponding to the path between the transmitting device and the receiving device.

11. The method of claim 1, wherein the method further comprises calculating the first beam-forming precoding vector based on measurements of a pilot signal transmitted by the receiving device.

12. The method of claim 11, wherein the method further comprises calculating the second beam-forming precoding vector based on measurements of the pilot signal transmitted by the receiving device.

13. A non-transitory computer-readable medium comprising, stored thereupon, a computer program product comprising program instructions for a processor in a transmitter device having a plurality of transmitter antennas, wherein said program instructions are configured so as to cause the transmitter device, when the program instructions are executed by the processor, to:

transmit to a receiving device at a first time, using a first beam-forming precoding vector that maps symbols to be transmitted to the plurality of transmitter antennas;

determine, prior to transmitting to the receiving device at a second time, whether an elapsed time since the first time exceeds a first threshold;

select one of at least two beam-forming precoding vectors for use in transmitting to the receiving device at the second time, based on said determining; and transmit to the receiving device at the second time, using the selected one of the at least two beam-forming precoding vectors;

wherein the program instructions are further configured so as to cause the transmitter device to perform at least one of the following:

calculate the first threshold based on an estimate of the decorrelation time of the first beam-forming precoding vector;

monitor a rotation of the transmitting device and calculate the first threshold based on said monitoring;

calculate the first threshold based on accelerometer data and/or gyroscope data of the transmitting device; and calculate the first threshold based on estimated Doppler information and/or estimated channel information corresponding to the path between the transmitting device and the receiving device.

14. A transmitter device comprising:

a plurality of transmitter antennas; and processing circuitry configured to use the plurality of transmitter antennas to:

transmit to a receiving device at a first time, using a first beam-forming precoding vector that maps symbols to be transmitted to the plurality of transmitter antennas;

determine, prior to transmitting to the receiving device at a second time, whether an elapsed time since the first time exceeds a first threshold;

select one of at least two beam-forming precoding vectors for use in transmitting to the receiving device at the second time, based on said determining; and transmit to the receiving device at the second time, using the selected one of the at least two beam-forming precoding vectors;

wherein the processing circuitry is further configured to perform at least one of the following:

calculate the first threshold based on an estimate of the decorrelation time of the first beam-forming precoding vector;

monitor a rotation of the transmitting device and calculate the first threshold based on said monitoring;

calculate the first threshold based on accelerometer data and/or gyroscope data of the transmitting device; and calculate the first threshold based on estimated Doppler information and/or estimated channel information corresponding to the path between the transmitting device and the receiving device.

15. The transmitter device of claim 14, wherein the processing circuitry is configured to select the first beam-forming precoding vector for transmitting to the receiving device at the second time, responsive to determining that the elapsed time since the first time does not exceed the first threshold.

16. The transmitter device of claim 14, wherein the processing circuitry is configured to select a second beam-forming precoding vector for transmitting to the receiving device at the second time, responsive to determining that the elapsed time since the first time exceeds the first threshold.

17. The transmitter device of claim 14, wherein the second beam-forming precoding vector has an associated decorrelation time that is greater than a decorrelation time associated with the first beam-forming precoding vector.

18. The transmitter device of claim 14, wherein the processing circuitry is further configured to calculate the first threshold based on an indication of the decorrelation time of the first beam-forming precoding vector.

19. The transmitter device of claim 14, wherein the processing circuitry is configured to monitor a rotation of the transmitting device, and calculate the first threshold based on said monitoring.

20. A User Equipment comprising the transmitter device of claim 15.

21. The User Equipment of claim 20, wherein the User Equipment is configured to be, during the elapsed time, in discontinuous reception (DRX) mode.

22. A method, in a transmitting device having a plurality of transmitter antennas, for selecting antenna beam-forming precoding vectors for transmissions, the method comprising:

transmitting to a receiving device at a first time, using a first beam-forming precoding vector that maps symbols to be transmitted to the plurality of transmitter antennas;

determining, prior to transmitting to the receiving device at a second time, whether an elapsed time since the first time exceeds a first threshold;

selecting one of at least two beam-forming precoding vectors for use in transmitting to the receiving device at the second time, based on said determining; and transmitting to the receiving device at the second time, using the selected one of the at least two beam-forming precoding vectors;

wherein the method comprises:

selecting a second beam-forming precoding vector for transmitting to the receiving device at the second time, responsive to determining that the elapsed time since the first time exceeds the first threshold, wherein the second beam-forming precoding vector has an associated decorrelation time that is greater than a decorrelation time associated with the first beam-forming precoding vector.

* * * * *